(12) United States Patent
Usami

(10) Patent No.: US 9,458,314 B2
(45) Date of Patent: Oct. 4, 2016

(54) FLUOROPOLYMER COMPOSITION

(71) Applicant: 3M INNOVATIVE PROPERTIES COMPANY, St. Paul, MN (US)

(72) Inventor: Noriyuki Usami, Kanagawa (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 235 days.

(21) Appl. No.: 14/378,814

(22) PCT Filed: Feb. 14, 2013

(86) PCT No.: PCT/US2013/026091
§ 371 (c)(1),
(2) Date: Aug. 14, 2014

(87) PCT Pub. No.: WO2013/123156
PCT Pub. Date: Aug. 22, 2013

(65) Prior Publication Data
US 2015/0024216 A1 Jan. 22, 2015

(30) Foreign Application Priority Data
Feb. 15, 2012 (JP) .................. 2012-030813

(51) Int. Cl.
C08L 27/12 (2006.01)
C08L 27/20 (2006.01)
C08J 7/04 (2006.01)
B29C 71/02 (2006.01)
B29K 27/12 (2006.01)

(52) U.S. Cl.
CPC ............... *C08L 27/20* (2013.01); *B29C 71/02* (2013.01); *C08J 7/08* (2013.01); *C08L 27/12* (2013.01); *B29K 2027/12* (2013.01); *C08J 2327/12* (2013.01); *C08J 2427/18* (2013.01); *C08L 2205/02* (2013.01); *Y10T 428/31544* (2015.04)

(58) Field of Classification Search
None
See application file for complete search history.

(56) References Cited

U.S. PATENT DOCUMENTS

| | | | |
|---|---|---|---|
| 3,067,262 A * | 12/1962 | Brady | C08F 14/26 106/10 |
| 4,981,912 A | 1/1991 | Kurihara | |
| 7,279,530 B2 * | 10/2007 | Higashira | C08F 14/18 525/326.3 |
| 2002/0068787 A1 | 6/2002 | Sterling | |
| 2005/0197458 A1 | 9/2005 | Kuboyama | |
| 2005/0261431 A1 | 11/2005 | Takahashi | |
| 2007/0114729 A1 * | 5/2007 | Hagano | C09D 127/12 277/628 |
| 2009/0286922 A1 * | 11/2009 | Stanga | C08F 214/16 524/544 |

FOREIGN PATENT DOCUMENTS

| | | |
|---|---|---|
| EP | 1031607 | 8/2000 |
| JP | S55-151051 | 11/1980 |
| JP | S59-071336 | 4/1984 |
| JP | S61-081437 | 4/1986 |
| JP | H01-060640 | 3/1989 |
| JP | H01-131255 | 5/1989 |
| JP | H01-141909 | 6/1989 |
| JP | H01-190447 | 7/1989 |
| JP | H01-301725 | 12/1989 |
| JP | H02-261850 | 10/1990 |
| JP | H06-016892 | 1/1994 |
| JP | H10-087863 | 4/1998 |
| JP | 2003-286357 | 10/2003 |
| JP | 2005-082654 | 3/2005 |
| JP | 2006-143977 | 6/2006 |
| JP | 2007-284608 | 11/2007 |
| JP | 2011-012212 | * 1/2011 |
| JP | 2011 012212 | 1/2011 |

OTHER PUBLICATIONS

International Search Report for PCT International Application No. PCT/US2013/026091, mailed on May 14, 2013, 4pgs.

* cited by examiner

*Primary Examiner* — Kara Boyle
(74) *Attorney, Agent, or Firm* — C. Michael Geise

(57) ABSTRACT

A fluoropolymer composition is provided containing a polymer containing perfluoroolefin units or partially fluorinated olefin units or a combination thereof, polytetrafluoroethylene having a melting point a melting point of 200° C. or more and 300° C. or less, and a crosslinking agent or a crosslinking promoter or a combination thereof. A molded article having a polytetrafluoroethylene layer on a surface is also provided.

6 Claims, No Drawings

FLUOROPOLYMER COMPOSITION

BACKGROUND

1. Technical Field

The present invention relates to a fluoropolymer composition.

2. Background

Fluoropolymers are used as various types of sealing members such as packing, gaskets, O-rings, and the like in the automotive market, industrial market, and electric and electronic market, because of the excellent heat resistance, oil resistance, weather resistance, low fuel permeability, and high compression permanent strain resistance thereof. However, there are frequently problems with sticking or adhering to substrates such as metal, plastic, rubber, ceramic, and the like. In other words, if a fluoropolymer member is in contact with these substrates for a long period of time, there is a problem that this may cause the fluoropolymer to stick or adhere.

For example, there is a possibility that, through sticking or adhering, a sealing member used in a semiconductor manufacturing process can contaminate the semiconductor component because of minute fragments (powder) that occur or can cause damage to the equipment because of breaking or detaching of old seal material fragments that have been degraded, when replacing with new components. Furthermore, with sealing members (such as electromagnetic valves) that are frequently opened and closed, equipment may stop operating properly because of sticking or adhering, possibly inducing failure when opening and closing.

With a stopper for a hard disk drive, there are problems with a malfunction similarly caused by sticking between the stopper and an arm. For example, the arm will not function properly because of sticking and adhering, and there will be problems with either reading or writing data to the hard disk drive or the like. Therefore, in many applications where there is contact between seals and other substrates, in addition to excellent sealing properties, there is strong demand for low tackiness or non-tackiness (also referred to as "low/non tackiness" in the present invention) and low adhesion or non-adhesion (also referred to as "low/non adhesion" in the present invention), with regard to the substrate. Many methods have been proposed in order to achieve low or non-tackiness and low or non-adhesion.

Conventionally, the addition of oils (for example silicone oil) is commonly known as a method for reducing sticking and adhering to various types of substrates. However, the additional oil causes inferior physical properties, and oil that leaks to the surface is tacky, and may be a cause of contamination on the rubber surface in some cases. Furthermore, the additional oils may cause malfunction or improper function of electronic devices such as a hard disk drive or the like due to gases produced and denatured deposits thereof.

Japanese Unexamined Patent Application Publication No. S63-291930 (Patent Document 1) discloses a method of modifying a fluorine containing elastomer molded article wherein the surface of a vulcanized molded part of a fluorine containing elastomer is subject to secondary vulcanization in the presence of a polyhydroxy compound. Japanese Unexamined Patent Application Publication No. H01-131255 (Patent Document 2) discloses a surface modified elastomer vulcanized molded body made by crosslinking with a vulcanizing agent, and then crosslinking toward the inner part from the surface of the molded body by using the crosslinking agent that has permeated from the surface. Japanese Unexamined Patent Application Publication No. H10-87863 (Patent Document 3) discloses a surface treatment solution for a fluorine rubber vulcanized material containing a crosslinking agent, alkali, and onium salt in a solvent, wherein the crosslinking agent is a dithiol compound. Japanese Unexamined Patent Application Publication No. S61-81437 (Patent Document 4) discloses a surface treatment method for a vulcanized fluorine rubber molded article wherein the surface of a vulcanized fluorine rubber molded article is treated with an amine or amine salt. Japanese Unexamined Patent Application Publication No. H1-190447 (Patent Document 5) discloses a non-tacky treatment method for surface treating a fluorine rubber vulcanized material containing a predetermined amount of bisamidate or alkylurea compound using an amine or amine salt.

Japanese Unexamined Patent Application Publication No. S59-71336 (Patent Document 6) discloses a surface treatment method for a molded rubber material, wherein the surface of the molded rubber material is treated with nitrogen plasma. Japanese Unexamined Patent Application Publication No. 2003-286357 (Patent Document 7) discloses a non-tackifying treatment method for a fluorine rubber molded body wherein nonequilibrium plasma of a saturated fluorocarbon gas is irradiated onto a cross-linked or non-cross-linked molded body made of fluorine rubber or a fluorine rubber composition. Japanese Unexamined Patent Application Publication No. 2005-82654 (Patent Document 8) discloses a non-tackifying method for a fluorine rubber molded body, wherein a fluorine rubber molded body is irradiated with a nonequilibrium plasma having a predetermined pressure and containing an olefin fluoride or containing an alkane fluoride where a ratio of a number of fluorine atoms to a number of carbon atoms is 2 or less.

Japanese Unexamined Patent Application Publication No. H01-141909 (Patent Document 9) discloses a surface treatment agent for a polymer containing a predetermined amount of a silicon functional silyl isocyanate and a predetermined amount of a hardening polyester. Japanese Unexamined Patent Application Publication No. H01-301725 (Patent Document 10) discloses a non-tacky fluorine rubber composition wherein a fluorine rubber-silicone reaction layer is formed on a vulcanized fluorine rubber surface.

Japanese Unexamined Patent Application Publication No. 2005-206627 (Patent Document 11) discloses a metal non-adhesive perfluoroelastomer molded body wherein a perfluoroelastomer cross-linked molded body is coated with an amorphous fluorine resin.

Japanese Unexamined Patent Application Publication No. H2-261850 (Patent Document 12) discloses a method where a predetermined amount of fluorine resin powder, a predetermined amount of organic solvent, and a vulcanizing agent are blended into a fluorine rubber, and then the fluorine rubber blend is heat treated and then molded.

Japanese Unexamined Patent Application Publication No. H01-60640 (Patent Document 13) discloses a non-tacky fluorine rubber composition where a predetermined bisamidate or alkyl urea compound is added to a fluorine rubber.

Japanese Unexamined Patent Application Publication No. 2006-143977 (Patent Document 14) proposes a fluorine rubber composition where a predetermined amount of barium stearate is added to a polyol vulcanized fluorine rubber.

Japanese Unexamined Patent Application Publication No. H06-16892 (Patent Document 15) discloses a method for manufacturing a low tackiness fluorine rubber, wherein a predetermined amount of an anti-aging agent with an antioxidant effect is added to a fluorine rubber blend, and then vulcanized and molded.

Japanese Unexamined Patent Application Publication No. 2007-284608 (Patent Document 16) discloses a non-tacky low friction fluorine rubber composition, wherein a predetermined amount of zinc oxide and magnesium oxide are added as an acid acceptor to a ternary fluorine rubber.

Japanese Unexamined Patent Application Publication No. 2011-12212 (Patent Document 17) discloses a manufacturing method for a fluorine rubber molded article, including (I) a kneading step of obtaining a crosslinking fluorine rubber composition by kneading (A) a fluorine rubber containing a tetrafluoroethylene/propylene copolymer and (B) a fluorine resin, at or above the melting point of the fluorine resin (B), (II) a molding and crosslinking step of obtaining a cross-linked molded article by molding the crosslinking fluorine rubber composition and then crosslinking, and (III) a heat treatment step of obtaining a fluorine rubber molded article by heat treating the cross-linked molded article at a temperature at or above the melting point of the fluorine resin (B).

SUMMARY

A treatment using a fluoroelastomer crosslinking agent solution brings about problems such as dimensional precision variation due to swelling of the fluoroelastomer vulcanized material by the solvent that is used, variation in the obtained low or non-tackiness, additional complicated processes, and safety and environmental issues due to the use of an organic solvent. Furthermore, plasma treatment has a problem with variations in the obtained low or non-tackiness and low or non-adhesion, and the sealing properties are degraded. Furthermore, special treatment equipment is also required.

Surface coating using a reactive resin cannot prevent peeling of the coating layer or reduction in the low or non-tackiness caused thereby.

The addition of a fluorine resin at a small level that can maintain the properties of the fluoroelastomer does not easily provide low or non-tackiness and low or non-adhesion to the rubber substrate. Furthermore, while the addition of a large amount of fluorine resin can provide low or non-tackiness and low or non-adhesion, there is a problem with deterioration of physical properties.

The addition of an organic lubricant or antioxidant cannot prevent deterioration of the physical properties of the vulcanized rubber. Furthermore, there is a problem with bloom (bleeding of organic lubricants and antioxidants to the surface of the rubber) during use, and contamination of the rubber surface and peripheral equipment can be caused by these particles that have bled out.

An object of the present invention is to provide a fluoropolymer composition that provides low or non-tackiness and low or non-adhesion, without deterioration of the excellent sealing properties and physical properties originally possessed by the fluoropolymer.

Furthermore, an object of the present invention is to provide a fluoropolymer composition that can provide a surface with strong water repellency and oil repellency as well as low friction properties.

An embodiment of the present invention provides a fluoropolymer composition, containing:

a polymer containing perfluoroolefin units or partially fluorinated olefin units, or a combination thereof;

polytetrafluoroethylene having a melting point of 200° C. or more and 300° C. or less; and a crosslinking agent or a crosslinking promoter, or a combination thereof.

According to an embodiment of the present invention, a fluoropolymer composition is provided that can favorably provide low or non-tackiness and low or non-adhesion. Furthermore, in another embodiment of the present invention, a molded article containing a hardened material of this sort of fluoropolymer composition is provided, which has favorable low or non-tackiness and low or non-adhesion.

DETAILED DESCRIPTION

Embodiments of the present invention and details thereof are described below. Other properties, objectives, advantages, and the like of the present invention will become obvious from the following content and from the attached claims. The content related to the various embodiments and elements of the present disclosure are intended to include arbitrary combinations of two or more aspects or elements, unless otherwise expressly noted.

Fluoropolymer Composition

An embodiment of the present invention provides a fluoropolymer composition containing a polymer containing perfluoroolefin units or partially fluorinated olefin units or a combination thereof, polytetrafluoroethylene having a melting point of 200° C. or more and 300° C. or less, and a crosslinking agent or a crosslinking promoter or a combination thereof. By using this type of fluoropolymer composition, a hardened material can be formed, having a polytetrafluoroethylene layer formed on a surface, low or non-tackiness and low or non-adhesion toward various substrates, and high water repellency and oil repellency as well as low friction properties.

The polymer containing perfluoroolefin units or partially fluorinated olefin units or a combination thereof (hereinafter referred to as "polymer containing fluorinated olefin units" or simply "polymer") can typically be an elastomer.

The perfluoroolefin unit can be a monomer unit derived from perfluoroolefins expressed by the formula $CF_2=CF-R_f$ (where $R_f$ represents a C1 to C8 perfluoroalkyl). These monomer units are preferable from the perspective of ease of manufacturing and ease of procurement. Preferable examples of the perfluoroolefin units include tetrafluoroethylene (TFE) units and hexafluoropropylene (HFP) units.

The partially fluorinated olefin units provide the softness of an elastomer, provide low temperature properties, and contribute to molding at the crosslinking points and the like. The partially fluorinated olefin units can be a perhalogenated olefin other than perfluoroolefin (such as chlorotrifluoroethylene (CTFE)), a hydrogenated partially fluorinated monomer (such as vinylidene flouride (VDF)), or the like.

In another embodiment that is preferable from the perspective of ease of manufacturing and ease of procurement, the partially fluorinated olefin units are made of partially fluorinated olefins expressed by the formula $CX_2=CX-R$ (where X independently represents hydrogen or fluorine and R represents hydrogen, fluorine, or a C1 to C8 alkyl; however at least one hydrogen atom and at least one fluorine atom are present in the molecule).

In a preferred embodiment, the partially fluorinated olefin unit is a vinylidene fluoride unit.

The polymer can include other monomer units in addition to the aforementioned perfluoroolefin units and partially fluorinated olefin units. Specific examples include monomer units derived from perfluorovinyl ether, monomer units derived from partially fluorinated vinyl ether, monomer units derived from hydrogenated but not halogenated monomers (for example, olefins such as ethylene, propylene, butene, pentene, hexene, and the like), and the like.

Examples of the perfluorovinyl ethers include perfluoroalkyl vinyl ethers (for example $CF_2=CFOCF_3$, $CF_2=CFOCF_2CF_2CF_3$, $CF_2=CFOCF(CF_3)CF_3$, and the like), perfluoro mono- or poly-alkoxyalkyl vinyl ethers (for example, $CF_2=CFOCF_2CF_2OCF_3$, $CF_2=CFOCF_2CF_2CF_2OCF_3$, $CF_2=CFOCF_2OCF_2CF_2CF_3$, $CF_2=CFOCF_2CF(CF_3)OCF_2CF_2CF_3$, $CF_2=CFOCF_2CF(CF_3)OCF_2CF(CF_3)OCF_2CF_2CF_3$, and the like), and the like.

In a preferred embodiment, the polymer contains approximately 5 mol % or more and approximately 100 mol % or less, or approximately 10 mol % or more and approximately 90 mol % or less, or approximately 15 mol % or more and approximately 85 mol % or less of perfluorinated monomer units, based on 100 mol % of total monomer units. The term perfluorinated monomer unit includes perfluoroolefin units, perfluorovinyl ether units, and the like. If the content of perfluorinated monomer units in the polymer is approximately 5 mol % or more, based on 100 mol % of total monomer units, there will be advantages from the perspective of oil resistance, solvent resistance, and chemical resistance, as well as providing thermal resistance, weathering resistance, ozone resistance, light resistance (ultraviolet light resistance and the like), flexibility, flame retardancy, and the like. The perfluorinated monomer unit content can be approximately 100 mol %, however, if the content is approximately 90 mol % or less for example, the effects of providing softness as an elastomer, providing low temperature properties, forming of crosslinking points, and the like will be more pronounced if partially fluorinated olefin units are used in combination, for example.

In a preferred embodiment, the polymer contains approximately 5 mol % or more and approximately 95 mol % or less, or approximately 10 mol % or more and approximately 90 mol % or less, or approximately 15 mol % or more and approximately 85 mol % or less of perfluoroolefin units, based on 100 mol % of total monomer units. If the content of perfluoroolefin units in the polymer is approximately 5 mol % or more, based on 100 mol % of total monomer units, there will be advantages from the perspective of oil resistance, solvent resistance, and chemical resistance, as well as providing thermal resistance, weathering resistance, ozone resistance, light resistance (ultraviolet light resistance and the like), flexibility, flame retardancy, and the like, but a content of approximately 95 mol % or less is preferable from the perspective of providing softness and the like.

In a preferred embodiment, the polymer contains approximately 5 mol % or more and approximately 95 mol % or less, or approximately 10 mol % or more and approximately 90 mol % or less, or approximately 15 mol % or more and approximately 85 mol % or less of partially fluorinated olefin units, based on 100 mol % of total monomer units. If the content of partially fluorinated olefin units in the polymer is approximately 5 mol % or more, the advantages of softness, low temperature properties, forming of sufficient crosslinking points, and the like can be achieved. On the other hand, if the content of partially fluorinated olefin units in the polymer is approximately 95 mol % or less, there will be advantages from the perspective of oil resistance, solvent resistance, and chemical resistance, as well as thermal resistance, weathering resistance, ozone resistance, and the like.

In a preferred embodiment, the polymer contains perfluoroolefin units and partially fluorinated olefin units. In this case, the preferable content of perfluoroolefin units and partially fluorinated olefin units in the polymer is as described above for each of the monomer units.

In a preferable embodiment, the polymer contains approximately 5 mol % or more and approximately 95 mol % or less, or approximately 10 mol % or more and approximately 90 mol % or less of perfluorovinyl ether units (preferably perfluoroalkyl vinyl ether units), based on 100 mol % of total monomer units. If the content of perfluorovinyl ether units in the polymer is approximately 5 mol % or more, there will be advantages from the perspective of low temperature properties, softness, and the like, and if the content is approximately 95 mol % or less, there will be advantages from the perspective of thermal resistance, price, and the like.

In a more preferable embodiment, the polymer contains approximately 1 mol % or more and approximately 99 mol % or less, or approximately 5 mol % or more and approximately 90 mol % or less, or approximately 10 mol % or more and approximately 60 mol % or less, of tetrafluoroethylene units, hexafluoropropylene units, perfluorovinyl ether units, or combinations of two or more types thereof (these are referred to as perfluorinated monomer units), and approximately 0 mol % or more and approximately 90 mol % or less, or approximately 5 mol % or more and approximately 85 mol % or less, or approximately 10 mol % or more and approximately 80 mol % or less of vinylidene fluoride units.

In a preferred embodiment, the polymer contains (1) approximately 10 mol % or more and approximately 100 mol % or less of one or more type of monomer unit selected from a group consisting of tetrafluoroethylene units, hexafluoropropylene units, and vinylidene fluoride units, and (2) approximately 0 mol % or more and approximately 90 mol % or less of one or more type of monomer unit selected from a group consisting of perfluorovinyl ether units and olefin units, based on 100 mol % of total monomer units. The aforementioned composition is advantageous from the perspective of enabling control of one or both of the softness and the low temperature properties, as desired. It is advantageous if the polymer contains perfluorovinyl ether units, from the perspective of softness and low temperature properties. It is advantageous if the polymer contains olefin units, from the perspective of softness.

In a preferred embodiment, the polymer contains approximately 10 mol % or more and 99.7 mol % or less of the aforementioned monomer units of (1), and approximately 0.3 mol % or more and approximately 90 mol % or less of the aforementioned monomer units of (2), based on 100 mol % of total monomer units.

The perfluorovinyl ether units and olefin units in the monomer units of (2) can be the units that were previously described as preferable specific examples of the perfluorovinyl ether units and olefin units. Particularly preferable perfluorovinyl ether units include perfluoro methyl vinyl ether units, perfluoro propoxyphene methyl vinyl ether units, and $CF_2=CFOCF(CF_3)CF_3$, $CF_2=CFOCF_2CF_2OCF_3$, $CF_2=CFOCF_2OCF_2CF_2CF_3$, $CF_2=CFOCF_2CF(CF_3)OCF_2CF_2CF_3$, and the like. These units are advantageous from the perspective of softness and low temperature properties. Furthermore, particularly preferable olefin units include ethylene, propylene, and the like. These units are beneficial from the perspective of providing rubber elasticity and resistance to amines and the like.

The amount of perfluorovinyl ether units used in the monomer units of (2) is preferably approximately 1 mol % or more or approximately 3 mol % or more, and preferably approximately 95 mol % or less, or approximately 90 mol % or less, or approximately 80 mol % or less, based on 100 mol % of the total monomer units. The amount of olefin units used in the monomer units of (2) is preferably approximately 1 mol % or more, or approximately 3 mol % or more, or approximately 5 mol % or more, and preferably approximately 90 mol % or less or approximately 70 mol % or less, based on 100 mol % of the total monomer units.

Preferable specific examples of the polymer include hexafluoropropylene/vinylidene fluoride copolymer, tetrafluoroethylene/hexafluoropropylene/vinylidene fluoride copolymer, tetrafluoroethylene/vinylidene fluoride/perfluorovinyl ether copolymer, tetrafluoroethylene/perfluorovinyl ether/ethylene copolymer, vinylidene fluoride/perfluorovinyl ether copolymer, hexafluoropropylene/ethylene copolymer, tetrafluoroethylene/propylene copolymer, tetrafluoroethylene/vinylidene fluoride/propylene copolymer, tetrafluoroethylene/perfluorovinyl ether copolymer, and the like.

The fluorine content of the polymer containing fluorinated olefin units is preferably approximately 30 mass % or more and approximately 76 mass % or less, or approximately 40 mass % or more and approximately 75 mass % or less, or approximately 45 mass % or more and approximately 74 mass % or less. A fluorine content of approximately 30 mass % or more is advantageous from the perspective of achieving favorable advantages for a fluoropolymer, such as chemical resistance, oil resistance, and thermal resistance. The theoretical upper limit of the fluorine content of the monomer containing fluorine, for example, is approximately 76 mass % for the case of tetrafluoroethylene units and hexafluoropropylene units. A fluorine content of approximately 75 mass % or more, for example, is advantageous from the perspective of softness as an elastomer, low temperature properties, and the like.

A commercial product may be used as the polymer containing fluorinated olefin units. Furthermore, a commercial polymer blend pre-blended with a crosslinking agent and/or a crosslinking promoter can also be used. Examples of commercial products include FC-2181, FC-2120, FC-2121, FC-2122, FC-2123, FC-2144, FC-2170, FC-2174, FC-2176, FC-2177, FC-2179, FLS-2530, FE-5610, FE-5620, FE-5621, FE-5640, FE-5641, FE-5660, FC-2211, FC-2145, FC-2230, FC-2178, and FC-2260 (all vinylidene fluoride/hexafluoropropylene copolymers) (available from Sumitomo 3M (Setagaya-ku, Tokyo)), FT-2320, FT-2350, FE-5730, FE-5840, FE-5831, FT-2430, FT-2481, FLS-2650, FPO-3740, and FPO-3741 (all vinylidene fluoride/hexafluoropropylene/tetrafluoroethylene copolymers) (available from Sumitomo 3M (Setagaya-ku, Tokyo)), BRE-7231 (vinylidene fluoride/tetrafluoroethylene/perfluoroalkyl vinyl ether copolymer) (available from Sumitomo 3M (Setagaya-ku, Tokyo)), LTFE-6400 (vinylidene fluoride/tetrafluoroethylene/perfluoroalkyl vinyl ether copolymer), PFE60X, PFE80X, PFE90X, PFE131T, PFE133TB, and PFE81T (all tetrafluoroethylene/perfluoroalkyl vinyl ether copolymers) (available from 3M (Minnesota, USA)), and the like.

Additional Polymers

The fluoropolymer composition can include one or two or more types of additional polymers that do not include fluorinated olefin units, in addition to the polymer containing fluorinated olefin units as described above. The additional polymer can be a homopolymer or a copolymer. The additional polymer can be blended with the polymer containing fluorinated olefin units.

The polymer units of the additional polymer are generally polymer units other than the fluorinated olefin units (such as perfluoroolefin units and partially fluorinated olefin units), from among the aforementioned various types of monomers units.

For example, the additional polymer can provide desired properties to the fluoropolymer composition of the present invention by combining with the crosslinking agent and/or crosslinking promoter that are used in the present invention. For example, the physical stability (for example, low temperature properties) of the fluoropolymer composition can be improved by combining with a peroxide hardening agent and additional polymers suitable for peroxide hardening. A balance between the thermal stability and the physical stability of the fluoropolymer composition obtained can be achieved along with economic effects by using this type of additional polymer.

If an additional polymer is used, a mass ratio of the polymer containing fluorinated olefin units is preferably approximately 20 mass % or more, or approximately 40 mass % or more, for a total of the polymer including fluorinated olefin units and the additional polymer, as contained in the fluoropolymer composition (hereinafter also referred to as polymer component). In this case as well, a fluoropolymer composition that can form a hardened material with low or non-tackiness and low or non-adhesion can be achieved. In several embodiments, the polymer component containing the fluoropolymer composition is simply a polymer containing only fluorinated olefin units.

The polymer containing fluorinated olefin units and the optional additional polymer can be produced using conventionally known methods. For example, the polymerization process can be performed by free radical polymerization of the monomer using water-based emulsion polymerization or solution polymerization in an organic solvent. When producing a blend of two or more types of polymers, a latex of the two or more polymers is blended at selected proportions, and then the blend is aggregated and dried. Alternatively, the polymers can be blended together in a mechanical mixer (such as a roller mill, kneader, or the like).

Types and amounts of terminal groups in the polymer containing fluorinated olefin units and the optional additional polymer are not specified. For example, the polymer can contain an $SO_3^-$ terminal group produced from an ammonium persulfate or metal salt persulfate (sodium salt, potassium salt, or the like)/sulfite salt system or the like. Furthermore, the polymer can contain a $COO^-$ terminal group produced by a polymerization initiator system such as ammonium persulfate or metal salt persulfate (sodium salt, potassium salt, or the like). Furthermore, the polymer can contain a "neutral" terminal group generated by using a fluorosulfonate polymerization initiator system or organic peroxide for example. The number of terminal groups can be greatly reduced by using an optional chain transfer agent. If desired, the presence of strongly polar terminal groups, such as $SO_3^-$ and $COO^-$ can be suppressed to a minimum in order to improve processability for example. Furthermore, if desired, the amount of $COO^-$ or other unstable terminal groups can be reduced by a commonly known secondary process (such as decarboxylation, secondary fluorination, or the like). Furthermore a polymer where iodine is bonded to the molecular terminus of the polymer molecule can be obtained by combining with a fluoroalkyl iodide as a chain transfer agent, and this type of polymer is also acceptable.

The polymer containing fluorinated olefin units and the optional additional polymer may contain hardening sites. The hardening sites can be halogens, copolymer sites induced by a nitrogen containing hardening site monomer, or the like. The nitrogen containing hardening site monomer is a monomer that contains a nitrogen containing hardening site (or in other words a component moiety that contains nitrogen and contributes to the hardening reaction). Therefore, the nitrogen containing hardening site contributes to the hardening properties of the polymer. The nitrogen containing hardening site can be a nitrile, imidate, amidine, amide, imide, or an amine-oxide group or the like. In a preferred embodiment, the nitrogen containing hardening site monomer is partially or completely fluorinated.

On the other hand, the halogen contributes to a peroxide hardening reaction. The halogen can be present in the molecular chain of the polymer component and/or on a terminal site. The halogen is typically bromine or iodine. The method of introducing the halogen to a site in the molecular chain of the polymer component is preferably copolymerization. Introduction of the halogen can be achieved if the monomer units that compose the polymer component include monomer units of: bromo- or iodo-fluoroolefins, such as bromodifluoroethylene, bromotrifluoroethylene, iodotrifluoroethylene, 1-bromo-2,2-difluoroethylene, and 4-bromo-3,3,4,4-tetrafluorobutene-1 and the like; bromo- or iodo-fluorovinyl ethers, such as $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like; and bromo- or iodo-olefins that are not fluorinated, such as vinyl bromide and 4-bromo-1 butene and the like.

The hardening sites may be terminal sites on the molecular chain of the polymer component. For example, a halogen can be introduced to a terminal position by using a chain transfer agent or a polymerization initiator. Generally, when preparing the polymer, an appropriate chain transfer agent is introduced in a reaction medium or else a hardening site is introduced to the terminal site by introducing with an appropriate polymerization initiator. For example, a method of introducing a halogen (such as iodine) suitable for a peroxide hardening reaction to the molecule terminus can be a method of polymerizing using the aforementioned fluoroalkyl iodide as a chain transfer agent. Specifically, a polymer containing iodine on the polymer terminus can be obtained by using $I(CF_2)_4I$, $(CF_3)_2CFI$, and the like. The fluoroalkyl iodide can be a perfluoroalkyl iodide where all of the hydrogen has been substituted with fluorine, or can contain a portion of the hydrogen. Furthermore, one, two, or more iodines are allowable. In this case as well, copolymerization is possible by using the aforementioned monomer containing iodine and/or bromine as the peroxide hardening site.

The polymer component may have a combination of two or more types of hardening sites. For example, including a polymer component containing a halogen that can contribute to peroxide hardening reactions along with a nitrogen containing hardening site, such as a nitrile group containing hardening site, is useful.

A total amount of hardening sites is preferably within a range that does not hinder the effect of the present invention, but the amount is preferably approximately 0.01 mol % or more and approximately 20 mol % or less, or approximately 0.1 mol % or more and approximately 10 mol % or less.

A Mooney viscosity (ML 1+10, 100° C.) of the polymer containing fluorinated olefin units and optional additional polymers is not particularly restricted, but is preferably approximately 1 or more from the perspective of achieving favorable physical properties and the like of the hardened material, and is preferably approximately 300 or less from the perspective of processability of the un-hardened material (for example kneading properties, flow properties during hardening, extrusion properties, and the like), and can be approximately 3 or more and approximately 280 or less, or approximately 5 or more and approximately 250 or less. The Mooney viscosity is a value measured using a Mooney viscometer (in conformance with JIS K6300).

The fluoropolymer composition contains polytetrafluoroethylene having a melting point of approximately 200° C. or more and approximately 300° C. or less (hereinafter also referred to as "low melting point PTFE"). The fluoropolymer composition according to an embodiment of the present invention contains low melting point PTFE with a melting point within the aforementioned specific range. The low melting point PTFE can be made to migrate to a surface of the hardened material without requiring a complex operation when molding the hardened material made from the fluoropolymer composition. A molded article containing this hardened material has a polytetrafluoroethylene layer on the surface, and therefore will have favorable low or non-tackiness and low or non-adhesion. Furthermore, the low melting point PTFE can migrate to the surface of the hardened material as described above, and therefore a favorable low or non-tackiness and low or non-adhesion can be achieved by using a small amount. In other words, the addition of a large amount of PTFE is not necessary in order to achieve the objectives of PTFE (typically with a melting point of approximately 327° C.) as conventionally used to prevent tackiness. Therefore, according to the embodiment of the present invention, tackiness and adhesion are reduced while water repellency, oil repellency, and low friction properties are provided to a molded article that is molded using the fluoropolymer composition, without loss of the original properties of the fluoropolymer.

Furthermore, the PTFE contains only carbon and fluorine, and essentially does not contain functional groups that can induce a reaction or an interaction with various substrates, and therefore the effect of reducing tackiness and adhesion is superior.

The melting point of the low melting point PTFE is approximately 200° C. or more, from the perspective of favorably maintaining the original properties of the polymer component, while favorably achieving migration, forming a sufficient polytetrafluoroethylene layer on the molded article, and preventing desorption. Furthermore, the melting point is approximately 300° C. or less, from the perspectives of suppressing loss of the original properties through thermolysis of the polymer component and suppressing evaporation of the low melting point of PTFE. In the present disclosure, the melting point is the value obtained for the endothermic peak temperature during differential thermal analysis such as DSC, DTA, or the like, or the melting temperature (measured as a temperature range) measured by visual evaluation (hereinafter also referred to as "visual method") in accordance with JIS K6220-1, 2 (2001 edition). Furthermore, in the present disclosure, when a substance having a specific melting point range is described, the melting point value obtained by at least one of the aforementioned measurement methods indicates substances that are included in the specific melting point range.

In a preferred embodiment, the low melting point PTFE has a number average molecular weight of approximately 600 or more and approximately 4000 or less. A number average molecular weight of approximately 600 or more is advantageous from the perspective of preventing evaporation or decomposition of the low melting point PTFE due to heat when molding the hardened material, and a number average molecular weight of approximately 4000 or less is advantageous from the perspective that low melting point PTFE migration will favorably proceed toward the surface of the hardened material. The number average molecular weight is a value measured using DI-MS (direct introduction mass spectrometry).

An amount of low melting point PTFE in the fluoropolymer composition is preferably approximately 0.05 mass parts or more or approximately 0.1 mass parts or more and preferably approximately 60 mass parts or less, or approximately 40 mass parts or less, or approximately 10 mass parts or less, based on 100 mass parts of the polymer component (or in other words the total of the polymer containing fluorinated olefin units and the optional additional polymer). If the amount of low melting point PTFE is approximately 0.05 mass parts or more or approximately 0.1 mass parts or more, there is an advantage from the perspective of achieving favorable low or non-tackiness and low or non-adhesion, and if the amount is approximately 60 mass parts or less, there is an advantage from the perspective of favorably maintaining the original physical properties of the polymer component.

Examples of preferable commercial products of the low melting point PTFE include CEFRAL LUBE V (available from Central Glass, melting point of 200 to 280° C. using the visual method).

The fluoropolymer composition according to an embodiment of the present invention includes a crosslinking agent, crosslinking promoter, or a combination thereof. In several embodiments, a combination of crosslinking agent and co-crosslinking agent can be used. Types and amounts of crosslinking agent, and/or crosslinking promoter, as well as optional co-crosslinking agent, can be appropriately selected by one skilled in the art based on the composition of the polymer component, from the various compounds that have capability to crosslink fluoropolymers, but suitable examples are described below.

An added amount of crosslinking agent is preferably approximately 0.05 mass parts or more, or approximately 0.1 mass parts or more and approximately 20 mass parts or less, or approximately 0.2 mass parts or more and approximately 10 mass parts or less, based on 100 mass parts of the polymer component (or in other words the total of the polymer containing fluorinated olefin units and the optional additional polymer). An added amount of 0.05 mass parts or more is advantageous from the perspective that crosslinking will proceed favorably and a hardened material with the desired physical properties will be obtained, as well as from the perspective that the crosslinking rate will be at a desired level, and an added amount of 20 mass parts or less is advantageous from the perspective that the crosslink density is controlled to a desired level, and from the perspective that excessive crosslinking speed can be prevented. If a crosslinking agent and a co-crosslinking agent are used in combination, the total added amount of crosslinking agent and co-crosslinking agent can be within the aforementioned range. Furthermore, there are cases where a crosslinking agent is not used, depending on the hardening site. For example, if a nitrile group (cyano group) is the hardening site, the nitrile groups may react together using only a crosslinking promoter and may crosslink to form a triazine ring or the like.

The crosslinking promoter can be used individually, or in combination with a crosslinking agent. An added amount of crosslinking promoter is preferably approximately 0.01 mass parts or more, or approximately 0.05 mass parts or more and approximately 20 mass parts or less, or approximately 0.1 mass parts or more and approximately 15 mass parts or less, based on 100 mass parts of the polymer component. An added amount of 0.01 mass parts or more is advantageous from the perspective that a sufficient crosslink promoting effect will be obtained and a hardened material with the desired physical properties will be obtained, as well as from the perspective that the crosslinking rate will be at a desired level, and an added amount of 20 mass parts or less is advantageous from the perspective that the crosslink density is controlled to a desired level, and from the perspective that excessive crosslinking speed can be prevented.

Moreover, there is a possibility that a required amount of crosslinking agent and/or crosslinking promoter, as well as of optional co-crosslinking agent, will be affected by the specific components that are selected. For example, there is a possibility that hardening can be accelerated or hindered depending on the type and/or amount of filler that is selected, as compared to a similar composition that does not contain filler, and therefore there will be a need to appropriately adjust the amount of crosslinking agent and/or crosslinking promoter, as well as the amount of optional co-crosslinking agent. This type of adjustment is commonly known to one skilled in the art.

The type of crosslinking agent and/or crosslinking promoter, as well as the type of optional co-crosslinking agent, are controlled by the composition of the polymer component. Furthermore, different crosslinking agents can be used in combination. For example, if a blend containing a first polymer that has a hardening site and a second polymer that does not have a hardening site is used, an effective amount of a first selected crosslinking agent and/or crosslinking promoter, as well as any optional co-crosslinking agent, is used to cross-link the first polymer, and an effective amount of a second selected crosslinking agent and/or crosslinking promoter, as well as any optional co-crosslinking agent, is used to cross-link the second polymer. The first and second selected crosslinking agent and/or crosslinking promoter, as well as the optional co-crosslinking agent, can be one type or a combination of two or more types of crosslinking compounds. Furthermore, the first and second selected crosslinking agent and/or crosslinking promoter, as well as the optional co-crosslinking agent, can be the same component, or can be different components. In other words, at least one type of a plurality of types of crosslinking agent and/or crosslinking promoter, as well as of optional co-crosslinking agent, should have a crosslinking effect on at least one type of polymer.

Examples of the crosslinking agent include polyol compounds, polythiol compounds, polyamine compounds, amidine compounds, bisaminophenol compounds, oxime compounds, organometal compounds, ammonia generating compounds, peroxide compounds, and the like. Furthermore, a co-crosslinking agent can be used as a portion of the crosslinking agent. Examples of the co-crosslinking agent include cyanurate compounds, polyunsaturated compounds, vinyl compounds, bisolefin compounds, and the like.

Of these, examples of preferable crosslinking agents include polyol compounds, polyamine compounds, amidine compounds, bisaminophenol compounds, oxime compounds, organometal compounds, ammonia generating compounds, peroxide compounds, and the like.

Generally, examples are not restricted for selecting the crosslinking agent and/or crosslinking promoter, as well as the optional co-crosslinking agent, depending on the type of polymer, but typical examples are presented below. For example, with a vinylidene fluoride system (binary system or ternary system), a polyol compound, polyamine compound, polythiophen compound, peroxide compound, or the like is preferable. For a low temperature type vinylidene fluoride system, a peroxide compound is preferable. With a tetrafluoroethylene-propylene fluorine rubber (binary) system, a peroxide compound or the like is preferable. With a tetrafluoroethylene-propylene-vinylidene fluoride-based fluorine rubber (ternary) system, a peroxide compound, polyol compound, polyamine compound, polythiol compound, or the like is preferable. With a perfluoroelastomer system, a peroxide compound, organometallic compound, amidine compound, bisaminophenol compound, oxime compound, ammonia generating compound, or the like is preferable.

Examples of a preferable co-crosslinking agent include vinyl compounds, cyanurate compounds, polyunsaturated compounds, and the like.

Examples of preferable polyol compounds include 2,2-bis(4-hydroxyphenyl) hexafluoropropane, 4,4'-dihydroxy diphenyl sulfone, 4,4'-diisopropylidene diphenol, and the like.

Examples of preferable polythiol compounds include 2-dibutyl amino-4,6-dimercapto-s-triazine, 2,4,6-trimercapto-s-triazine, and the like.

Examples of preferable polyamine compounds include hexamethylene diamine carbamate, N,N'-dicinnamylidene-1,6-hexanediamine, 4,4'-methylene bis(cyclohexylamine) carbonate, and the like.

Examples of preferable amidine compounds include p-toluene sulfonate salts of 1,8-diazabicyclo[5.4.0]undec-7-ene, and the like.

Examples of preferable bisaminophenol compounds include 2,2-bis(3-amino-4-hydroxyphenyl))-hexafluoropropane, 2,2-bis[3-amino-4-(N-phenylamino) phenyl]hexafluoropropane, and the like.

Examples of preferable oxime compounds include bisamino oxime, bisamide oxime, and the like.

Preferable examples of organometallic compounds include compounds containing arsenic, antimony, or tin, such as allyl-tin, propargyl-tin, triphenyl-tin, allenyl-tin, and tetraphenyl-tin, as well as triphenyl tin hydroxide, and the like.

Preferable examples of ammonia generating compounds include compounds that are solid or liquid under ambient conditions, but produce ammonia under hardening conditions. Preferable examples include hexamethylene tetramine (urotropin), dicyandiamide, and metal containing compounds with a form according to the formula $A^{w+}(NH_3)_xY^{w-}$ (where $A^{w+}$ represents a metal cation such as $Cu^{2+}$, $Co^{2+}$, $Co^{3+}$, $Cu^+$ or $Ni^{2+}$; w is equivalent to the atomic valence of the metal cation; $Y^{w-}$ represents the counter ion, typically a halogen, sulfate, nitrate, acetate, or the like; and x represents an integer from 1 to approximately 7).

Examples of other ammonia producing compounds include substituted or unsubstituted triazine derivatives, for example, those compounds according to the following formula:

[Chemical formula 1]

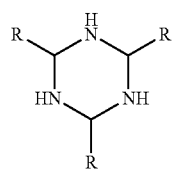

(where R independently represent a hydrogen atom or a substituted or unsubstituted alkyl, aryl, or aralkyl group having from 1 to approximately 20 carbon atoms). Specific examples of useful triazine derivatives include hexahydro-1,3,5-s-triazine and acetaldehyde ammonia trimer.

Preferable peroxide compounds are generally those that produce a free radical at the hardening temperature. Dialkyl peroxide and bis(di-alkyl peroxide) are particularly preferable because these compounds decompose at temperatures above 50° C. In many cases, a di-tert-butyl peroxide containing a tertiary carbon atom with a peroxidic oxygen atom is preferable. Examples of the most useful peroxides of this type include 2,5-dimethyl-2,5-di(tert-butylperoxy) hexene-3 and 2,5-dimethyl-2,5-di(tert-butylperoxy) hexane. Other peroxides that can be selected as this type of compound include dicumyl peroxide, dibenzoyl peroxide, tert-butyl perbenzoate, α,α'-bis(t-butylperoxy-diisopropylbenzene), di[1,3-dimethyl-3-(t-butylperoxy)-butyl]carbonate, and the like. Generally, from approximately 1 to approximately 3 mass parts of peroxide are used for 100 mass parts of the polymer component.

Vinyl compounds contribute to favorable crosslinking as a co-crosslinking agent in combination with a peroxide crosslinking agent. Examples of favorable vinyl compounds generally include compounds represented by the general formula $CH_2=CHR_fCH=CH_2$ (where $R_f$ represents a $C_1$ to $C_8$ straight chain or branched at least partially fluorinated alkylene, cycloalkylene, or oxyalkylene). Moreover, in the formula, one or a plurality of hydrogen atoms may be substituted with a halogen atom such as fluorine. Similarly, polymers having a side chain of $CH_2=CHR_f-$ (where $R_f$ is as defined above) and polymers where one or a plurality of hydrogen atoms in the formula are substituted with a halogen atom such as fluorine are also useful.

Cyanurate compounds also contribute to favorable crosslinking as a co-crosslinking agent in combination with a peroxide crosslinking agent. Examples of cyanurate compounds include triallyl cyanurate, triallyl isocyanurate, tri (methylallyl)isocyanurate, tri(5-norbornene-2-methylene) cyanurate, trivinyl isocyanurate, and the like. Particularly useful cyanurate compounds include triallyl isocyanurate and tri(methylallyl)isocyanurate.

Polyunsaturated compounds contribute to favorable hardening by acting as a co-crosslinking agent in combination with a peroxide crosslinking agent. Examples of polyunsaturated compounds include divalent metal acrylates, divalent metal methacrylates, N,N'-m-phenylenedimaleimide, triallyl trimellitate, and the like. Particularly useful polyunsaturated compounds include zinc acrylate and zinc methacrylate.

Examples of crosslinking promoters include organic onium compounds, sulfone compounds, sulfoxide compounds, and the like. Of these, preferable examples are organic onium compounds.

Organic onium compounds are preferably combined with polyol crosslinking agents, polythiol crosslinking agents, and the like, and preferable examples include quaternary ammonium salts, quaternary phosphonium salts, oxonium salts, sulfonium salts, and the like. More specific examples include triphenylbenzyl phosphonium chloride, 8-benzyl-1, 8-diazabicyclo [5,4,0]-7-undecenium chloride and the like.

Other Components

The fluoropolymer composition can also contain various additives in addition to the aforementioned components. Examples of additives include crosslinking auxiliary agents and/or crosslinking promoting auxiliary agents that combine favorably with the crosslinking agent and/or crosslinking promoter used, fillers (such as carbon black, flowers of zinc, silica, diatomaceous earth, silicate compounds (clay, talc, wollastonite, and the like), calcium carbonate, titanium oxide, sedimentary barium sulfate, aluminum oxide, mica, iron oxide, chromium oxide, fluoropolymer filler, and the like), plasticizers, lubricants (graphite, molybdenum disulfide, and the like), release agents (fatty acid esters, fatty acid amides, fatty acid metals, low molecular weight polyethylene, and the like), colorants (cyanine green and the like), and processing aids that are commonly used when compounding fluoropolymer compositions, and the like. However, these additives are preferably sufficiently stable under the intended conditions of use.

Furthermore, the carbon black can be used to achieve a balance between fluoropolymer composition properties such as tensile stress, tensile strength, elongation, hardness, wear resistance, conductivity, processability, and the like. Preferable examples include MT blacks under the product numbers N-991, N-990, N-908, and N-907 (medium thermal black); FEF N-550; and large diameter furnace black, and the like. If carbon black is used, the amount is preferably from approximately 0.1 to approximately 70 mass parts (phr) based on 100 mass parts of the total amount of polymer containing fluorinated olefin units and the additional polymer. This range is particularly preferable for the case where large particle furnace black is used.

The fluoropolymer composition can also contain one or a plurality of types of acid acceptors. However, if the presence of an extractable metal compound is not desirable (such as semiconductor applications), the use of inorganic acid acceptors should be minimized, and these preferably should not be used at all. For example, a hardening composition with a formula that does not use an inorganic acid acceptor is particularly useful for sealing materials and gaskets for manufacturing semiconductor elements, sealing materials that are in contact with water, hot water, or the like, and sealing materials for high temperature areas such as automotive applications.

Examples of acid acceptors that are commonly used include zinc oxide, calcium hydroxide, calcium carbonate, magnesium oxide, hydrotalcite, silicon dioxide (silica), lead oxide, and the like. These compounds are generally used in order to bond with HF and other acids. These acids are possibly produced at high temperatures that can be encountered during the hardening process when molding a molded article using the fluoropolymer composition, or at temperatures that demonstrate the function of fluoropolymers and the like.

The fluoropolymer composition can be produced by compounding the formulation components, or in other words the polymer containing fluorinated olefin units, the optional additional polymer, the low melting point PTFE, the cross-linking agent and/or cross-linked promoting agent, as well as the optional co-crosslinking agent and the optional other types of additives. More specifically, a desired amount of low melting point PTFE, a desired amount of crosslinking agent and/or cross-linked promoting agent, as well as a desired amount of optional additives, are added to the polymer component, and then the formulation components of the fluoropolymer composition are sufficiently blended, or in other words compounded, using any common rubber mixing device. Examples of this device include sealed mixers (such as kneaders and Banbury mixers), roller mills, and other simple mixing devices. Typically, the mixing temperature during mixing preferably does not exceed approximately 120° C. During mixing, the other components are preferably uniformly dispersed in the polymer component.

Molded Article Containing Hardened Material of the Fluoropolymer Composition Another embodiment of the present invention provides a molded article that contains the hardened material of the fluoropolymer composition according to the present invention, and this molded article has a polytetrafluoroethylene layer on a surface. The fluoropolymer composition of the present invention is useful for manufacturing molded articles such as O-rings, gaskets, tubes, sheeting, films, sealing materials, and the like.

Another embodiment of the present invention provides a method of manufacturing a molded article, including the steps of forming a hardened material by heat treating the fluoropolymer composition at a temperature below a melting point of the polytetrafluoroethylene, which has a melting point of 200° C. or more and 300° C. or less (or in other words the low melting point PTFE of the present disclosure), and then forming a molded article having a polytetrafluoroethylene layer on a surface by heat treating the hardened material at a temperature above the melting point of the polytetrafluoroethylene.

Typical procedures for this method are presented below. Note, in the present disclosure, the phrase "temperature above the melting point of low melting point PTFE" refers to a temperature above a reference temperature arbitrarily selected from either the minimum value for the melting temperature using the visual method (measured as a temperature range) or the endothermic peak temperature determined by differential thermal analysis. Furthermore, the phrase "temperature below the melting point of the low melting point PTFE" refers to a temperature below the reference temperature as defined above.

First, the hardened material is formed by heat-treating (referred to as preliminary hardening in the present disclosure) the fluoropolymer composition at a temperature below the melting point of the low melting point PTFE. Specifically, the hardened material is formed by heating and molding a mixture obtained by compounding the formulation components of the fluoropolymer composition as described above (for example under pressure). The mixture is processed and molded by extruding (for example in the shape of a film, tube, or hose) or molding (for example in the shape of a sheet or O-ring). Preliminary hardening is normally performed at a temperature sufficient to harden the mixture for a desired period of time at an appropriate pressure. The preliminary hardening temperature is preferably approximately 95° C. or more and approximately 230° C. or less, or approximately 150° C. or more and approximately 205° C. or less. The preliminary hardening time is preferably approximately 1 minute or longer and approximately 15 hours or shorter, or approximately 5 minutes or longer and approximately 30 minutes or shorter. Normally, a pressure of approximately 700 kPa to approximately 21,000 kPa is applied to the mixture in the mold. The mold may be first coated with a release agent, and then baked.

A temperature difference between the reference temperature for the low melting point PTFE and the temperature of the preliminary hardening that is lower than the reference temperature is preferably approximately 5° C. or more and approximately 200° C. or less, or approximately 5° C. or more and approximately 180° C. or less or approximately 5° C. or more and approximately 160° C. or less. If the aforementioned temperature difference is approximately 5° C. or more, melting of the low melting point PTFE can be favorably prevented, and a hardened material where the low melting point PTFE is uniformly dispersed can be formed. On the other hand, if the temperature difference is less than approximately 200° C., the fluidity of the compounded material can be favorably maintained, so a hardened material having a desired shape can easily be formed.

The hardened material obtained by preliminary hardening is heat treated at a temperature above the melting point of the low melting point PTFE (referred to as secondary hardening in the present disclosure). Thereby, the low melting point PTFE is melted. Furthermore, the low melting point PTFE migrates to the surface of the hardened material because of the low surface energy thereof, and forms a thin polytetrafluoroethylene layer on the surface. As a result, a molded article with low or non-tackiness and low or non-adhesion, as well as high water repellency and oil repellency and low friction properties can be formed. The secondary hardening is performed in a heating oven at a sufficient temperature and for sufficient time to complete the hardening of the hardened material obtained by preliminary hardening. The temperature for secondary hardening is appropriately selected based on the type of components (particularly polymer components) in the composition. For example, secondary hardening can be performed at a temperature that is preferably 100° C. or more and 300° C. or less, or approximately 230° C. or more and approximately 260° C. or less, or approximately 230° C. The temperature should exceed the melting point of the low melting point PTFE for at least a portion of the time during secondary hardening. The time for secondary hardening is preferably approximately 1 hour or longer and approximately 48 hours or less, or approximately 2 hours or longer and approximately 24 hours or less, or approximately 4 hours or longer, and approximately 24 hours or less, but generally the time increases as the intended thickness of the cross-section of the molded article increases. The temperature during secondary hardening of a thick molded article is normally increased gradually from a lower limit temperature to a target maximum temperature. The maximum temperature used preferably is an upper limit of approximately 300° C., and this temperature is preferably maintained for approximately 4 hours or longer. Normally, crosslinking is completed and the volatile components that exist in the hardened material can be evaporated off by the secondary hardening.

The preliminary hardening and the secondary hardening can be performed as separate processes, or can be performed as one continuous process. The hardened material obtained after preliminary hardening can be hardened during secondary hardening until the low melting point PTFE has a low fluidity and selectively migrates to the surface of the molded article. Therefore, the hardened material can be in a so-called semi-hardened condition.

The temperature difference between the reference temperature for the low melting point PTFE and the temperature of the secondary hardening that is higher than the reference temperature is preferably approximately 5° C. or more and approximately 150° C. or less, or approximately 5° C. or more and approximately 120° C. or less or approximately 5° C. or more and approximately 100° C. or less. If the temperature difference is approximately 5° C. or more the low melting point PTFE will easily be melted, and the low melting point PTFE will migrate to the surface of the molded article. Therefore, a molded article with a polytetrafluoroethylene layer on the surface can easily be formed. On the other hand, if the temperature difference is less than approximately 150° C., decomposition and degradation of the formulation components can be prevented.

The temperature profile for the secondary hardening can be appropriately designed in order to achieve the desired molded article, and a plurality of temperature settings can be used in the process. For instance, one example of a favorable cycle for secondary hardening for the case of a composition containing a polymer component made of perfluoroelastomer includes the following six stage processing conditions in a nitrogen gas environment. The hardened material obtained from the preliminary process is first heated from 25° C. to 200° C. over 6 hours, then maintained at 200° C. for 16 hours, then heated from 200° C. to 250° C. over 2 hours, then maintained at 250° C. for 8 hours, then heated from 250° C. to 300° C. over 2 hours, and then maintained at 300° C. for 16 hours. Finally, the heating of the oven is stopped, and the hardened material is returned to ambient temperature.

The molded article obtained by secondary hardening is typically completely hardened, and the volatile components are favorably eliminated. However, an additional hardening process can be performed in order to further harden and/or eliminate the volatile components.

The method according to the embodiment of the present invention described above can provide a molded article with low or non-tackiness and low or non-adhesion by forming a polytetrafluoroethylene layer on the surface of the molded article. Furthermore, this polytetrafluoroethylene layer is formed by migrating from the inside of the hardened material, and therefore is easily formed, and unlike a surface layer that is formed by coating or the like, for example, the layer will not easily be desorbed, and thus has the advantage that the favorable physical properties of the molded article can be maintained.

With the molded article of the embodiment of the present invention, the presence of the polytetrafluoroethylene layer on the surface is easily confirmed by measuring the contact angle using water or the like, or by infrared spectrum analysis of the surface portion.

EXAMPLES

The present invention is further described below using working examples and comparative examples, but the present invention is not restricted to these examples.

Each of the measurements are performed as described below. MDR (moving die rheometer) hardening properties An unhardened sample was tested using a process analyzer from Alpha Technologies in conformance with JIS K6300-2 2001. Both the minimum torque (ML) and the highest torque (MH) for a case where a flat part or a maximum torque could not be obtained were measured for a predetermined period of time. Furthermore, the time until the torque reached a value equal to ML+0.1 (MH−ML) ("10% hardening time") and the time until the torque reached a value equal to ML+0.9 (MH−ML) ("90% hardening time") were also measured.

Physical Properties

Duro A Hardness

The Duro A hardness was measured using a type A-2 Shore durometer in conformance with JIS K6253 2006.

Tensile Strength, Elongation at Break, and 100% Tensile Stress

A test piece cut from a sheet of hardened material into the shape of a #3 dumbbell as described in JIS K 6251 (1993) using a die was tested for tensile strength, elongation at break, and 100% tensile stress, in conformance with JIS K6251 (1993). The units used for reporting the results are percent and MPa.

Compressive Permanent Strain

A disk shaped sample of hardened material (diameter: approximately 29 mm, thickness: 12.5 mm) was measured for temperature and time as shown in the table, in accordance with JIS K6262 2006. The results are reported as a percentage of the original compressive deformation (as 25%).

Tackiness (Tensile Strength at Break)

A sheet of hardened material was compression bonded onto chromium plated steel plate that had been decreased with 2-butanone at a pressure of 9.8 kPa (6 cm×2.5 cm, 1.5 kg load), and left in an oven at 150° C. for 1 hour. Next, the sample was cooled at room temperature for 3 hours. The pressure was maintained while cooling. Next, the load was removed, and the tensile strength at breaking was measured at a tensile speed of 50 mm/minute in conformance with JIS K6251 1993.

Contact Angle

The contact angle was measured by a droplet method using a solid liquid interface analyzer (DropMaster 700 manufactured by Kyowa Interface Science) in conformance with JIS R3257.

[Melting Point]

The melting point was a value measured by measuring a low molecular weight polytetrafluoroethylene in accordance with an existing melting point method according to JIS K6220-1 and 2 (2001), or by a differential thermal analysis device (DTA (differential thermal analysis) or DSC (differential scanning calorimeter measurement)).

[Number Average Molecular Weight]

The number average molecular weight of the low molecular weight polytetrafluoroethylene was a value measured by a DI-MS (direct introduction mass spectroscopy) device or by the melting point method.

Exemplary embodiment include the following:

Embodiment 1. A fluoropolymer composition, comprising:
   a polymer containing perfluoroolefin units or partially fluorinated olefin units, or a combination thereof;
   polytetrafluoroethylene having a melting point of 200° C. or more and 300° C. or less; and
   a crosslinking agent or a crosslinking promoter, or a combination thereof.

Embodiment 2. The fluoropolymer composition according to embodiment 1, wherein the polytetrafluoroethylene has a number average molecular weight of 600 or more and 4000 or less.

Embodiment 3. The fluoropolymer composition according to embodiment 1 or 2, comprising 0.1 mass parts or more and 60 mass parts or less of polytetrafluoroethylene for 100 mass parts of the polymer.

Embodiment 4. The fluoropolymer composition according to embodiment 1 or 2, wherein, based on 100 mol % of total monomer units, the polymer contains:
   10 mol % or more and 100 mol % or less of at least one type of monomer unit selected from a group consisting of tetrafluoroethylene units, hexafluoropropylene units, and vinylidene fluoride units.

Embodiment 5. The fluoropolymer composition according to embodiment 1 or 2, wherein, based on 100 mol % of total monomer units, the polymer contains:
   10 mol % or more and 99.7 mol % or less of at least one type of monomer unit selected from a group consisting of tetrafluoroethylene units, hexafluoropropylene units, and vinylidene fluoride units; and
   0.3 mol % or more and 90 mol % or less of at least one type of monomer unit selected from perfluorovinyl ether units and olefin units.

Embodiment 6. A molded article, comprising a hardened material of the fluoropolymer composition according to any one of embodiments 1 through 5, and having a polytetrafluoroethylene layer on a surface.

Embodiment 7. A method for manufacturing a molded article, comprising the steps of:
   forming a hardened material by heat treating the fluoropolymer composition according to any one of embodiments 1 through 5 at a temperature below a melting point of the polytetrafluoroethylene; and
   forming a molded article having a polytetrafluoroethylene layer on a surface by heat treating the hardened material at a temperature above the melting point of the polytetrafluoroethylene.

Example 1

An unhardened rubber compound sheet was formed by adding 20 mass parts of carbon filler (MTCarbon (available from Cancarb)), six mass parts of calcium hydroxide (Calem, available from Ohmi Chemical Industry), three mass parts of magnesium oxide (Kyowamag 150, available from Kyowa Chemical), and four mass parts of low melting point PTFE (Cefral Lube V, available from Central Glass, having a number average molecular weight of 700 to 4,000 (DI-MS, catalog value) with a melting point in a broad range of 200 to 280° C. (visual method, catalog value) and a melting point peak determined by differential thermal analysis (measured value) of 272° C.) to a vinylidene fluoride/hexafluoropropylene copolymer (vinylidene fluoride units/hexafluoropropylene units=approximately 80/approximately 20 (mole ratio)) (FC-2181, with internal polyol crosslinking agent and onium salt crosslinking promoter, available from Sumitomo 3M (Setagaya-ku, Tokyo) using a rubber mill, and then kneading to form the unhardened rubber compound sheet. Next, the sample was press hardened in a molding machine for 10 minutes at 170° C. (preliminary hardening), and then hardened for 24 hours in a heating oven at 230° C. (secondary hardening) to obtain a hardened material. This hardened material is an example of a molded article according to the present invention.

The MDR hardening properties of the unhardened rubber compound sheet, and the physical properties, tackiness, and contact angle with water and n-hexadecane of the hardened material are presented in Table 1.

The sticking strength (tensile strength at break) of the hardened material was 0, and thus the sample was superior with no tackiness and no adhesion.

The water contact angle of the hardened material was 114°. This is equivalent to the generally accepted contact angle for water of PTFE. This value for the contact angle was caused by the PTFE layer that had formed on the surface of the hardened material.

Comparative Example 1

A test was performed in a manner similar to Working Example 1, except that a fluoroelastomer compound that did not contain PTFE was used. In this example, the tackiness was higher than Working Example 1.

Comparative Example 2

A test was performed in a manner similar to Working Example 1, except that the Cefral Lube V was replaced with Cefral Lube 1 (PTFE available from Central glass, number average molecular weight 4,600 to 14,800 (melting point method, catalog value, relationship between melting point and molecular weight in accordance with U.S. Pat. No. 3,067,262, calculated as molecular weight=200/(685 (1/melting point (° K)-1/600), and melting point of 305 to 320° C. (DTA method)). This example demonstrated higher tackiness. Furthermore, the water contact angle was lower than the working example.

Comparative Example 3

A test was performed in the same manner as Working Example 1, except that TF9205 (PTFE available from Sumitomo 3M, number average molecular weight of several hundred thousand, melting point of approximately 327° C. (DSC method)) was used in place of the Cefral Lube V. This example also demonstrated higher tackiness. Furthermore, the water contact angle was lower than Working Example 1.

Comparative Example 4

A test was performed in a manner similar to Working Example 1, except that low molecular weight polyethylene (Poly AC-6A, available from Honeywell international, dropping point 106° C.) was used in place of the Cefral Lube V. This example also demonstrated higher tackiness. Furthermore, the water contact angle was lower than Working Example 1.

TABLE 1

|  | Working Example 1 | Comparative Example 1 | Comparative Example 2 | Comparative Example 3 | Comparative Example 4 |
|---|---|---|---|---|---|
| Fluoropolymer composition (mass parts) | | | | | |
| Fluoroelastomer (*1) | 100 | 100 | 100 | 100 | 100 |
| MT Carbon | 20 | 20 | 20 | 20 | 20 |
| Calcium hydroxide | 6 | 6 | 6 | 6 | 6 |
| Magnesium oxide | 3 | 3 | 3 | 3 | 3 |
| Low melting point PTFE (*2) | 4 | | | | |
| PTFE (*3) | | | 4 | | |
| PTFE (*4) | | | | 4 | |
| Low molecular weight polyethylene (*5) | | | | | 4 |
| MDR Hardening properties (170° C./10 minutes) | | | | | |
| Minimum torque (dNm) | 1.8 | 1.8 | 1.9 | 1.9 | 1.7 |
| Maximum torque (dNm) | 15.7 | 16.0 | 16.3 | 17.0 | 14.7 |
| 10% hardening time (minutes) | 2.1 | 2.0 | 2.0 | 2.0 | 2.0 |
| 90% hardening time (minutes) | 5.2 | 5.5 | 5.6 | 5.1 | 5.2 |
| Ordinary properties | | | | | |
| Hardness (Duro A) | 66 | 65 | 65 | 66 | 70 |
| Tensile strength (MPa) | 12.4 | 14.2 | 10.5 | 13.5 | 12.8 |
| Elongation at break (%) | 290 | 280 | 240 | 290 | 290 |
| 100% Tensile stress (MPa) | 2.7 | 2.9 | 3.1 | 3.1 | 3.4 |
| Compressive permanent strain (200° C./70 hours) | | | | | |
| Disk plate, 25% compression (%) | 14 | 12 | 11 | 11 | 14 |
| Tackiness | | | | | |
| Tensile strength at break (N) | 0 (natural peeling) | 48 | 43 | 49 | 47 |
| Contact angle (°) | | | | | |
| water | 114 | 103 | 107 | 106 | 104 |
| n-hexadecane | 62 | 56 | 55 | 57 | 59 |

(*1) Vinylidene fluoride/hexafluoropropylene compolymer
(*2) Melting point: 200 to 280° C.
(*3) Melting point: 305 to 320° C.
(*4) Melting point: 305 to 327° C.
(*5) Melting point: 106° C.

Examples 2 through 4 and Comparative Examples 5 to 7

A test was performed in a manner similar to Working Example 1, except that the component formulas and conditions presented in Table 2 were used. The MDR hardening properties of the unhardened rubber compound sheet, and the physical properties and tackiness of the hardened material are presented in Table 2.

TABLE 2

|  | Working Example 2 | Working Example 3 | Working Example 4 | Comparative Example 5 | Comparative Example 6 | Comparative Example 7 |
|---|---|---|---|---|---|---|
| Fluoropolymer composition (mass parts) | | | | | | |
| Fluoroelastomer (*1) | 100 | | | 100 | | |
| Fluoroelastomer (*2) | | 100 | | | 100 | |
| Fluoroelastomer (*3) | | | 100 | | | 100 |
| MT Carbon | 20 | 20 | 40 | 20 | 20 | 40 |
| Perhexa 25B-40 | 3 | | 3 | 3 | | 3 |
| TAIC | 2.5 | | 1.8 | 2.5 | | 1.8 |
| Flowers of zinc | 3 | | 5 | 3 | | 5 |
| Magnesium oxide | | 9 | | | 9 | |
| Low melting point PTFE (*4) | 4 | 4 | 4 | | | |

TABLE 2-continued

| | Working Example 2 | Working Example 3 | Working Example 4 | Comparative Example 5 | Comparative Example 6 | Comparative Example 7 |
|---|---|---|---|---|---|---|
| MDR Hardening properties (170° C./10 minutes) | | | | | | |
| Minimum torque (dNm) | 1.7 | 1.2 | 4.2 | 1.7 | 1.2 | 4.4 |
| Maximum torque (dNm) | 12.7 | 9.2 | 13.6 | 13.1 | 9.4 | 14.4 |
| 10% hardening time (minutes) | 0.8 | 2.6 | 0.6 | 0.8 | 2.5 | 0.6 |
| 90% hardening time (minutes) | 5.4 | 6.6 | 3.9 | 5.1 | 6.4 | 4.0 |
| Ordinary properties 1 (Preliminary hardening (press): 170° C./10 minutes, Secondary hardening (heating oven): 230° C./24 hours) | | | | | | |
| Hardness (Duro A) | 67 | 65 | 64 | 67 | 64 | 64 |
| Tensile strength (MPa) | 16.0 | 16.1 | 11.5 | 17.4 | 16.5 | 12.3 |
| Elongation at break (%) | 270 | 250 | 190 | 260 | 230 | 180 |
| 100% Tensile stress (MPa) | 3.4 | 3.3 | 4.5 | 3.9 | 3.8 | 4.9 |
| Ordinary properties 1 (Preliminary hardening (press): 170° C./10 minutes, Secondary hardening (heating oven): 260° C./24 hours) | | | | | | |
| Hardness (Duro A) | 67 | 65 | 63 | 68 | 64 | 64 |
| Tensile strength (MPa) | 15.4 | 13.2 | 10.9 | 16.5 | 13.0 | 11.1 |
| Elongation at break (%) | 290 | 240 | 200 | 290 | 240 | 190 |
| 100% Tensile stress (MPa) | 3.2 | 3.3 | 3.8 | 3.6 | 3.6 | 4.1 |
| Compressive permanent strain (200° C./70 hours) --- Secondary hardening, 230° C./24 hours | | | | | | |
| Disk plate, 25% compression (%) | 37 | 34 | 21 | 32 | 35 | 18 |
| Tackiness Tensile strength at break (N) | | | | | | |
| secondary hardening: 230° C./24 hours | 0 (natural peeling) | 9 | 22 | 51 | 49 | 41 |
| Secondary hardening: 260° C./24 hours | 0 (natural peeling) | 0 (natural peeling) | 0 (natural peeling) | 40 | 47 | 59 |

(*1) Vinylidene fluoride/tetrafluoroethylene/hexafluropropylene copolymer (including hardening site monomer)
(*2) Vinylidene fluoride/tetrafluoroethylene/propylene copolymer (internal crosslinking agent, crosslinking promoter)
(*3) Vinylidene fluoride/tetrafluoroethylene/perflurovinyl ether copolymer (including hardening site monomer)
(*4) Melting point: 200° C. to 280° C.

A description of the formulation components presented in Table 2 is shown below.

Vinylidene fluoride/tetrafluoroethylene/hexafluoropropylene copolymer (containing hardening site monomer) (FLS-2650, available from Sumitomo 3M (Setagaya-ku, Tokyo)

Vinylidene fluoride/tetrafluoroethylene/propylene copolymer (containing internal crosslinking agent and crosslinking promoter) (BRE-7231, available from Sumitomo 3M (Setagaya-ku, Tokyo)

Vinylidene fluoride/tetrafluoroethylene/perfluorovinyl ether copolymer (containing hardening site monomer) (LTFE-6400, available from Sumitomo 3M (Setagaya-ku, Tokyo)

MT Carbon (same as described in Working Example 1)

Perhexa 25B-40 (crosslinking agent) (2,5-dimethyl-2,5-di(t-butylperoxy) hexane (purity 40%), available from NOF Corp)

TAIC (co-crosslinking agent) (triallyl isocyanurate, available from Nippon Kasei)

Flowers of zinc (Special No. 1, available from Sakae Chemical)

Magnesium oxide (same as described in Working Example 1)

Low melting point PTFE (same as described in Working Example 1)

As shown in Table 2, in working examples 2 through 4, when the secondary hardening was performed at 230° C., the sticking strength of the hardened material was lower than Comparative Examples 5 to 7. Moreover, when the secondary hardening was performed at 260° C., because all values were zero, excellent non-tackiness and non-adhesion were clearly demonstrated.

Examples 5 through 8 and Comparative Example 8

A test was performed in a manner similar to Working Example 1, except that the component formulas and conditions presented in Table 3 were used. The MDR hardening properties of the unhardened rubber compound sheet, and the physical properties and tackiness of the hardened material are presented in Table 3.

TABLE 3

|  | Working Example 5 | Working Example 6 | Working Example 7 | Working Example 8 | Comparative Example 8 |
|---|---|---|---|---|---|
| Fluoropolymer composition (mass parts) | | | | | |
| Perfluoroelastomer (*1) | 100 | 100 | 100 | 100 | 100 |
| MT Carbon | 20 | 20 | 20 | 20 | 20 |
| Amidene crosslinking agent | 0.7 | 0.7 | 0.7 | 0.7 | 0.7 |
| Methanol | 2.8 | 2.8 | 2.8 | 2.8 | 2.8 |
| Low melting point PTFE (*2) | 0.1 | 0.5 | 2 | 4 | 0 |
| MDR Hardening properties (165° C./30 minutes) | | | | | |
| Minimum torque (dNm) | 1.8 | 20 | 2.0 | 2.5 | 2.2 |
| Maximum torque (dNm) | 16.8 | 14.5 | 16.1 | 16.3 | 16.4 |
| 10% hardening time (minutes) | 1.3 | 0.7 | 0.8 | 0.9 | 1.0 |
| 90% hardening time (minutes) | 12.2 | 15.3 | 15.1 | 14.9 | 15.1 |
| Ordinary properties 1 (Preliminary hardening (press): 165° C./30 minutes, Secondary hardening (heating oven): Hardened in steps (*3)) | | | | | |
| Hardness (Duro A) | 75 | 79 | 76 | 77 | 75 |
| Tensile strength (MPa) | 16.5 | 19.0 | 16.4 | 18.9 | 19.6 |
| Elongation at break (%) | 130 | 140 | 120 | 130 | 130 |
| 100% Tensile stress (MPa) | 10.7 | 10.9 | 11.5 | 11.5 | 12.4 |
| Tackiness | | | | | |
| Tensile strength at break (N) | 26 | 0 (natural peeling) | 0 (natural peeling) | 0 (natural peeling) | 50 |

(*1) Tetrafluoroethylene/perflurovinyl ether copolymer (including hardening site monomer)
(*2) Melting point: 200 to 280° C.
(*3) Secondary hardening conditions: Heat from room temperature to 150° C. over 1 hour; Maintain 150° C. for 7 hours; Heat from 150 to 300° C. over 2 hours; Maintain at 300° C. for 4 hours; Gradually reduce temperature from 300° C. to room temperature over 2 hours.

A description of the formulation components presented in Table 3 is shown below.

Tetrafluoroethylene/perfluorovinyl ether copolymer (containing hardening site monomer) PFE-191TZ, available from 3M (Minnesota, USA))

MT Carbon (same as described in Working Example 1)

Amidine crosslinking agent (PFE-300C, available from 3M (Minnesota, USA))

Low melting point PTFE (same as described in Working Example 1)

As shown in Table 3, in working examples 5 through 8, the sticking strength of the hardened material was much lower than Comparative Example 8, and the non-tackiness and non-adhesion were clearly superior compared to Comparative Example 8.

Comparative Examples 9 and 10

A test was performed in a manner similar to Working Example 1, except that the component formulas and conditions presented in Table 4 were used. The MDR hardening properties of the unhardened rubber compound sheet, and the physical properties and tackiness of the hardened material are presented in Table 4.

TABLE 4

|  | Comparative Example 9 | Comparative Example 10 |
|---|---|---|
| Fluoropolymer composition (mass parts) | | |
| Fluoroelastomer (*1) | 100 | 100 |
| MT Carbon | 20 | 5 |
| Perhexa 25B-40 | 3 | 3 |

TABLE 4-continued

|  | Comparative Example 9 | Comparative Example 10 |
|---|---|---|
| TAIC | 2.5 | 2.5 |
| Flowers of zinc | 3 | 3 |
| Ethylene/tetrafluoroethylene copolymer | 4 | 43 |
| MDR Hardening properties (170° C./10 minutes) | | |
| Minimum torque (dNm) | 1.7 | 2.8 |
| Maximum torque (dNm) | 11.4 | 18.1 |
| 10% hardening time (minutes) | 0.8 | 0.9 |
| 90% hardening time (minutes) | 5.4 | 5.3 |
| Ordinary properties 1 (Preliminary hardening (press): 170° C./10 minutes; Secondary hardening (heating oven): 230° C./10 minutes) | | |
| Hardness (Duro A) | 68 | 78 |
| Tensile strength (MPa) | 12.4 | 12.3 |
| Elongation at break (%) | 220 | 220 |
| 100% Tensile stress (MPa) | 3.9 | 7.8 |
| Ordinary properties 2 (Preliminary hardening (press): 170° C./10 minutes; Secondary hardening (heating oven): 18 Hardened in steps *3)) | | |
| Hardness (Duro A) | 68 | 77 |
| Tensile strength (MPa) | 13.3 | 15.3 |
| Elongation at break (%) | 250 | 270 |
| 100% Tensile stress (MPa) | 3.7 | 7.7 |
| Compressive permanent strain (200° C./70 hours) - Secondary hardening: 230° C./24 hours | | |
| Disk plate, 25% compression (%) | 35 | 56 |
| Tackiness | | |

TABLE 4-continued

|  | Comparative Example 9 | Comparative Example 10 |
|---|---|---|
| Tensile strength at break (N) | | |
| Secondary hardening: 230° C./24 hours | 62 | 33 |
| Secondary hardening in steps (*3) | 33 | 0 (natural peeling) |

(*1) Vinylidene fluoride/tetrafluoroethylene/hexafluropropylene copolymer (including hardening site monomer)
*2 Melting point: 266° C.
(*3) Secondary hardening conditions: 230° C./2 hours; Then, 275° C./4 hours; Then, 230° C./2 hours A description of the formulation components presented in Table 4 is shown below.

Vinylidene fluoride/tetrafluoroethylene/hexafluoropropylene copolymer (including hardening site monomer) (same as described for Table 2)
MT Carbon (same as described in Working Example 1)
Perhexa 25B-40 (same as described for Table 2)
TAIC (same as described for Table 2)
Flowers of zinc (same as described for Table 2)
Ethylene/tetrafluoroethylene copolymer (ETFE6235Z, melting point 266° C. (DSC method), available from Sumitomo 3M (Setagaya-ku, Tokyo)

As illustrated in Table 4, the sticking strength of the hardened material was higher for Comparative Example 9, where the amount of ethylene tetrafluoroethylene copolymer was relatively low, and the compressive permanent strain was higher in Comparative Example 10 where the amount of this copolymer was relatively high. In other words, in both Comparative Example 9 and 10, a hardened material with favorable non-tackiness and non-adhesion could not be obtained while maintaining the physical properties of the fluoroelastomer.

The present invention can be favorably applied to various types of valves such as electromagnetic valves, control valves, gas opening and closing valves, gas seals, water control valves, and the like, as well as oil seals, gaskets, O-rings, packing materials for electronics, impact absorbing stoppers for hard disk drives, fuel cap gaskets, oil level gauges, and the like.

What is claimed is:

1. A fluoropolymer composition, comprising:
    a polymer containing perfluoroolefin units or partially fluorinated olefin units, or a combination thereof;
    polytetrafluoroethylene having a melting point of 200° C. or more and 300° C. or less; and
    a crosslinking agent or a crosslinking promoter, or a combination thereof.

2. The fluoropolymer composition according to claim 1, wherein the polytetrafluoroethylene has a number average molecular weight of 600 or more and 4000 or less.

3. The fluoropolymer composition according to claim 1, comprising 0.1 mass parts or more and 60 mass parts or less of polytetrafluoroethylene for 100 mass parts of the polymer.

4. The fluoropolymer composition according to claim 1, wherein, based on 100 mol % of total monomer units, the polymer contains:
    10 mol % or more and 99.7 mol % or less of at least one type of monomer unit selected from a group consisting of tetrafluoroethylene units, hexafluoropropylene units, and vinylidene fluoride units; and
    0.3 mol % or more and 90 mol % or less of at least one perfluorovinyl ether units.

5. A molded article, comprising a hardened material of the fluoropolymer composition according to claim 1, and having a polytetrafluoroethylene layer on a surface of the hardened material.

6. A method for manufacturing a molded article, comprising the steps of:
    forming a hardened material by heat treating the fluoropolymer composition according to claim 1 at a temperature below a melting point of the polytetrafluoroethylene; and
    forming a molded article having a polytetrafluoroethylene layer on a surface of the hardened material by heat treating the hardened material at a temperature above the melting point of the polytetrafluoroethylene.

* * * * *

UNITED STATES PATENT AND TRADEMARK OFFICE
CERTIFICATE OF CORRECTION

PATENT NO. : 9,458,314 B2
APPLICATION NO. : 14/378814
DATED : October 4, 2016
INVENTOR(S) : Noriyuki Usami It is certified that error appears in the above-identified patent and that said Letters Patent is hereby corrected as shown below:

In the Specification

Column 4
Line 49, Delete "flouride" and insert -- fluoride --, therefor.

Column 12
Line 62, Delete "polythiophen" and insert -- polythiophene --, therefor.

Column 23
Line 43 (Approx.), Delete "hexafluropropylene" and insert -- hexafluoropropylene --, therefor.
Line 45 (Approx.), Delete "perflurovinyl" and insert -- perfluorovinyl --, therefor.

Column 25
Line 28 (Approx.), Delete "perflurovinyl" and insert -- perfluorovinyl --, therefor.

Column 26
Line 56, After "(heating oven):" delete "18".

Column 27
Line 10 (Approx.), Delete "hexafluropropylene" and insert -- hexafluoropropylene --, therefor.

Signed and Sealed this
Sixth Day of June, 2017

Michelle K. Lee
*Director of the United States Patent and Trademark Office*